US006336782B1

(12) United States Patent
Pawlak et al.

(10) Patent No.: US 6,336,782 B1

(45) Date of Patent: Jan. 8, 2002

(54) METHOD AND DEVICE FOR UNLOADING SHEET-LIKE OBJECTS FROM CONTAINERS

(75) Inventors: Uwe Pawlak, Neunkirchen; Hans-Jürgen Buchard, Wendelstein, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,365

(22) PCT Filed: Jul. 27, 1998

(86) PCT No.: PCT/DE98/02122

§ 371 Date: Mar. 27, 2000

§ 102(e) Date: Mar. 27, 2000

(87) PCT Pub. No.: WO99/15284

PCT Pub. Date: Apr. 1, 1999

(30) Foreign Application Priority Data

Sep. 25, 1997 (DE) ........................................ 197 42 367

(51) Int. Cl.[7] ............................ B65G 65/23; B07C 1/02

(52) U.S. Cl. ....................... 414/403; 414/414; 414/421; 414/810

(58) Field of Search ................................ 414/403, 414, 414/421, 810

(56) References Cited

U.S. PATENT DOCUMENTS

| | | | | |
|---|---|---|---|---|
| 2,344,664 A | * | 3/1944 | Adams | 414/414 |
| 5,906,468 A | * | 5/1999 | Vander Syde et al. | 414/403 |

FOREIGN PATENT DOCUMENTS

| | | | | |
|---|---|---|---|---|
| DE | 3021367 | * | 6/1980 | 414/414 |
| DE | 691 00 524 | | 2/1994 | |
| EP | 0 464 771 | | 1/1992 | |
| EP | 562688 | * | 9/1993 | 414/403 |
| FR | 2 288 562 | | 5/1976 | |
| FR | 2 706 331 | | 12/1994 | |

* cited by examiner

*Primary Examiner*—Steven A. Bratlie

(74) *Attorney, Agent, or Firm*—Venable; Robert Kinberg; Chad C. Anderson

(57) ABSTRACT

A method and device for unloading stacked sheet-like items from an open box-shaped container with an open top into a v-shaped receiving device is provided. The box-shaped container is inserted into a holding device. The top of the box-shaped container is closed off with a plunger. The box-shaped container and holding device is swung such that a side wall of the holding device is approximately aligned against and overlaps a flank of the v-shaped receiving device. The plunger is lifted off the top of the box-shaped container and swung to the side such that the items slide into the receiving device.

4 Claims, 2 Drawing Sheets

METHOD AND DEVICE FOR UNLOADING SHEET-LIKE OBJECTS FROM CONTAINERS

BACKGROUND OF THE INVENTION

The invention relates to a method and a device for unloading sheet-like items, stacked one above the other with their flat sides, in particular letters, from box-shaped containers that are open on the top into a v-shaped receiving device.

Up to now, postal items and in particular large envelopes have always been delivered to a letter-sorting machine such that the items are stacked flat one above the other in box-shaped containers, each with an open top. An operator then removes the postal items from the containers and places these into a v-shaped receiving device, after which they are handled automatically.

European Patent A-464771 additionally discloses a solution using a container tilting device where the operator no longer must lift the postal items from the container, but must push them from the tilted container onto the receiving device.

SUMMARY OF THE INVENTION

It is the object of the invention to create a device and a method for automatically placing the sheet-like items, arriving flatly stacked in the container, into an upright position for sorting in the transfer device.

For a method of the aforementioned type, this object is solved according to the invention in that the containers are respectively inserted into a holding device and the opening of the respective container is subsequently closed off with a plunger. Following this, the closed holding device is swung with one side wall approximately aligned against one of the flanks of the receiving device, thereby overlapping this flank, wherein the closed opening is facing the v-shaped bottom of the receiving device. The plunger is then removed from the items and is swung to the side, such that the items slide into the receiving device.

The aforementioned object is furthermore solved according to the invention for a device of the initially mentioned type in that the individual containers can be inserted into a holding device and the opening of the respective container can be closed off with a plunger. The closed holding device can subsequently be swung with one side wall approximately aligned against one of the flanks of the receiving device, thereby overlapping this flank, wherein the closed opening is facing the v-shaped bottom of the receiving device, such that the plunger can be lifted off the items and swung to the side and the items can slide into the receiving device.

BRIEF DESCRIPTION OF THE DRAWINGS

One exemplary embodiment of the invention is shown in the drawing and is explained in further detail in the following, wherein.

DETAILED DESCRIPTION OF THE DRAWINGS

Figure 1:
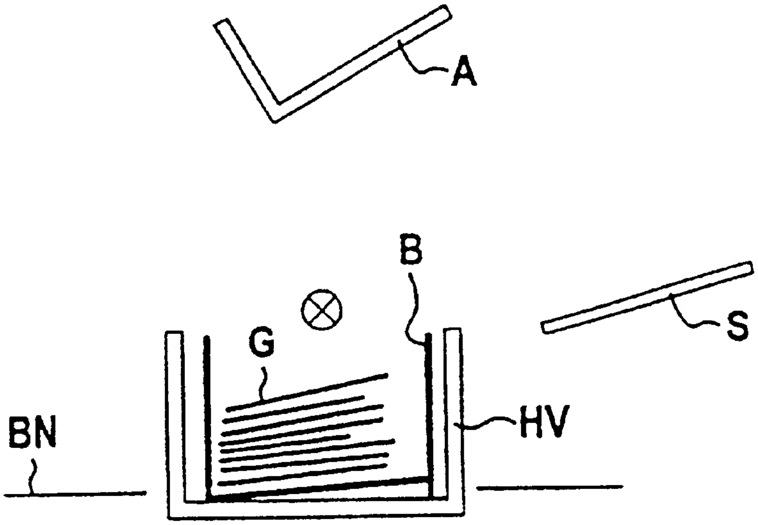
FIGS. 1 to 4 Show successive situations during the automated handling.

The basic diagram shown in FIG. 1 illustrates how a container B for postal items G is inserted from a loading plane BN into a holding device HV. The insertion movement, which is directed toward the representational plane, is indicated with a crossed circle. The container B in the inserted state is secured in the holding device HV with auxiliary means, not shown herein for reasons of clarity. The container B, which is then secured immovably in the holding device HV, is open on the top. A plunger S is located to the side of holding device HV. The purpose of this plunger will be discussed further in the following since it is extremely important to the invention.

A tub-shaped receiving device A for postal items, in particular for large envelopes, is arranged above the holding device HV. The receiving device A has a v-shape alignment and is designed to accept the flatly stacked items G such that they are standing on edge.

Figure 2:
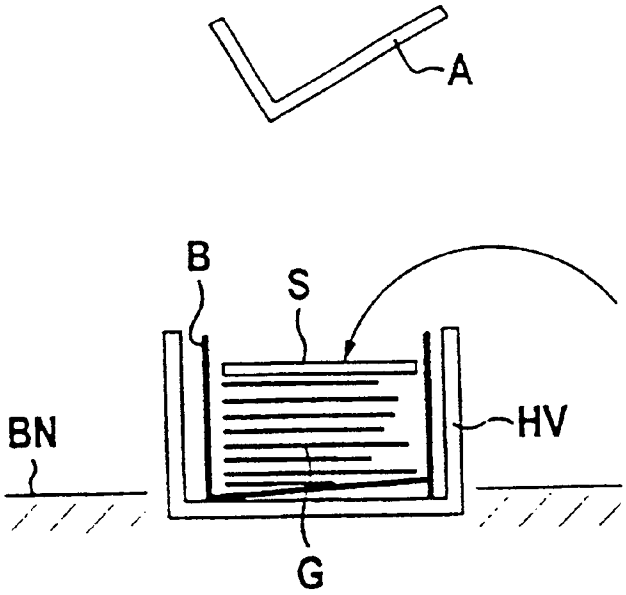

The illustration according to FIG. 2 shows that by executing a swinging movement, as indicated with an arrow, the plunger S is pressed against the postal items G, thereby covering the tub-shaped container B.

Figure 3:
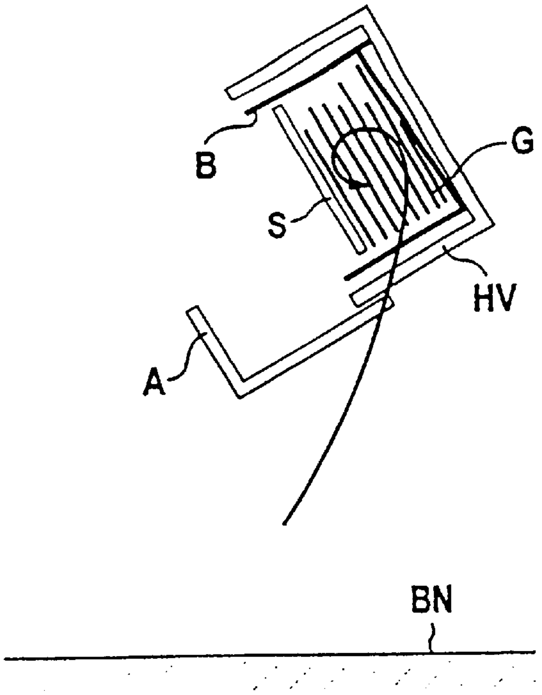
Figure 4:
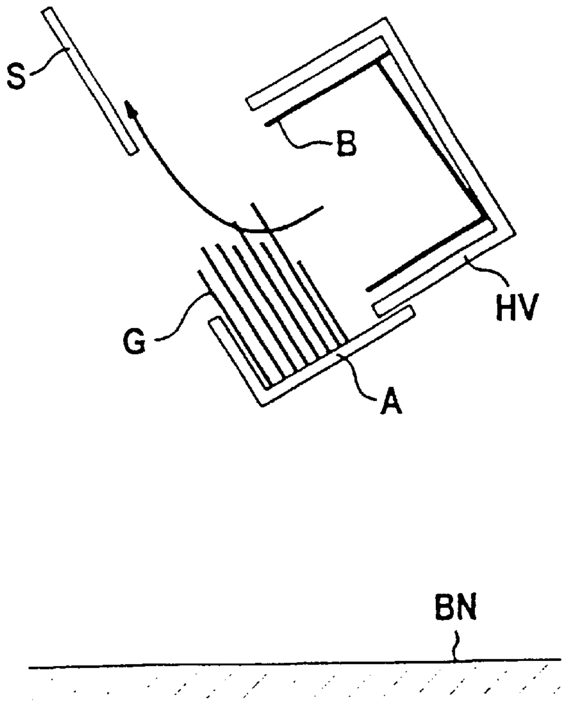

Following this, the holding device HV with secured container B and postal items G located therein is swung upward, as indicated with the arrow in FIG. 3. The pressed-on plunger S prevents the postal items G from falling out of the container B. The holding device HV is in this way moved toward the receiving device A, so as to prepare for an independent removal of the postal items G, as indicated in the illustration according to FIG. 4. The arrow in this Figure furthermore shows that the plunger S is lifted off the postal items G, wherein the items G slide into the tub-shaped receiving device A. For this, the plunger S is also pulled off to the side.

From this position, the holding device HV can move the containers into an unloading plane, which does not necessarily have to coincide with the loading plane BN where containers are again released from the holding device HV into the process. Following this, the holding device HV is once more available for accepting new containers.

In principle, the receiving device A for postal items G can be arranged stationary. However, it is also possible that the receiving device A is moved to downstream transfer positions by another mechanism, which is not shown for reasons of clarity.

We claim:

1. A method for unloading stacked sheet-like items from a box-shaped container with an open top into a v-shaped receiving device, the method comprising:

- inserting the box-shaped container into a holding device;
- closing off the top of the box-shaped container with a plunger;
- swinging the box-shaped container and holding device such that a side wall of the holding device is approximately aligned against and overlaps a flank of the v-shaped receiving device; and
- lifting the plunger off the top of the box-shaped container and swinging the plunger to one side such that the items slide into the receiving device, wherein the receiving device is stationary during the unloading method.

2. The method of claim 1, wherein the items are letters.

3. A device for unloading stacked sheet-like items, comprising:

- a box-shaped container having an open top;
- a holding device with at least one side wall and a bottom, said box-shaped container being inserted into the holding device;
- a v-shaped receiving device having at least one flank to form a v-shaped bottom, wherein the v-shaped receiving device remains stationary during unloading of the items;
- a plunger for closing off the top of the box-shaped container;

means for swinging the closed-off box-shaped container and the holding device with the plunger closing off the top so that at least one of the side walls of the holding device is aligned against at least one flank to overlap the flank; and means for lifting the plunger off the top of the box-shaped container such that the items slide into the receiving device.

4. The device of claim 3, wherein the items are letters.

* * * * *